Patented Nov. 19, 1940

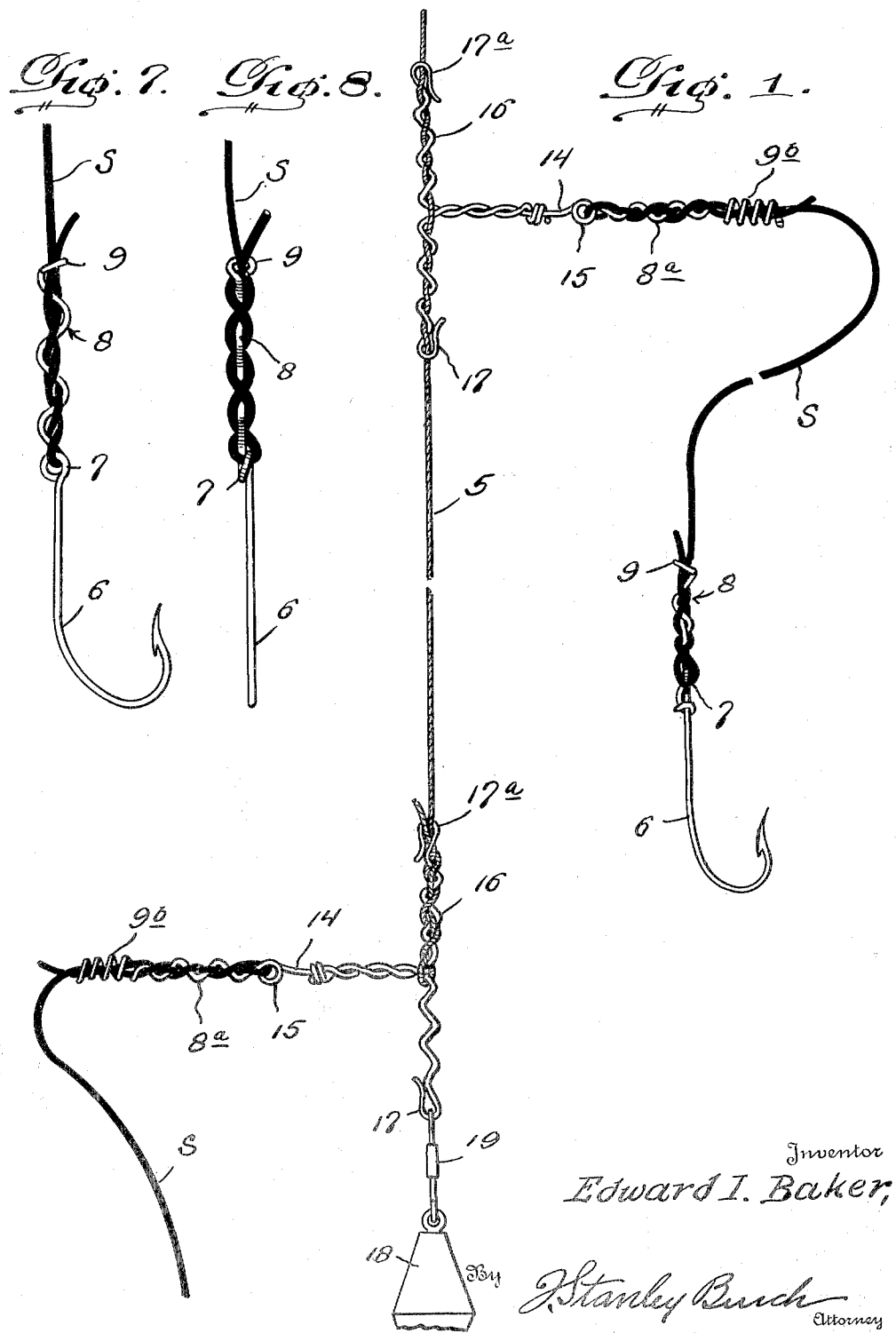

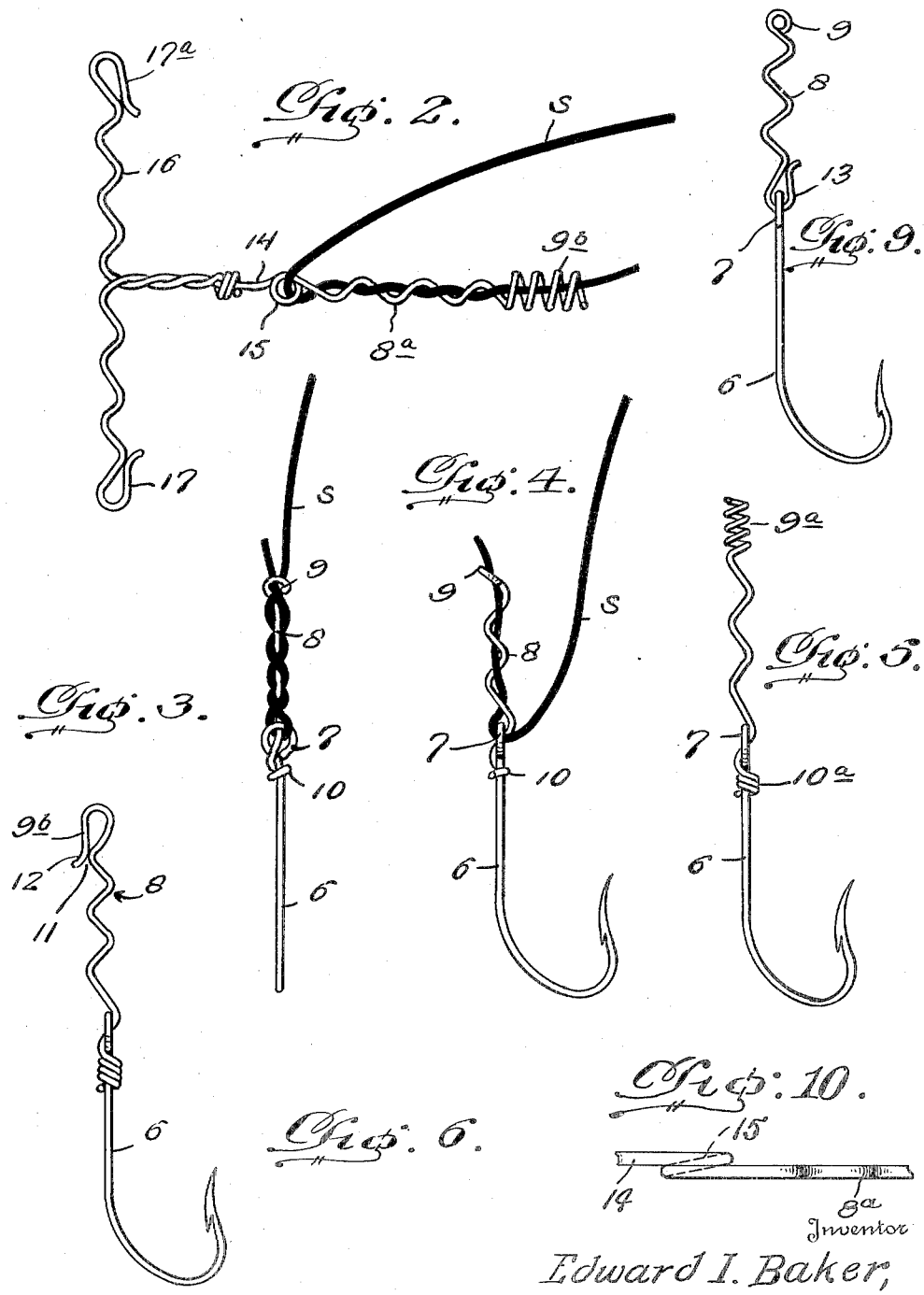

2,222,277

UNITED STATES PATENT OFFICE 2,222,277

FISHING TACKLE

Edward I. Baker, Atlantic City, N. J.

Application January 7, 1939, Serial No. 249,811

7 Claims. (Cl. 43—28)

This invention relates generally to fishing tackle, and has more particular reference to an improved device for attacing a snell to a fishing hook or to a fishing line.

It is a common practice to form the ends of a snell with permanent loops to effect attachment of one end to a fishing hook and to provide for attachment of the other end of the snell to a fishing line. As the snells are generally made of gut, they are quite brittle and stiff, with the result that the snell often breaks at the bend of the loop where most of the strain occurs. Naturally, when the loop at either end of the snell becomes broken, the tackle is rendered unfit for use, it being impractical to repair the same by tying the gut leader into knots at the ends, and the fisherman having no facilities for producing a new permanent loop at the end of the snell while out fishing.

A specific object of the present invention is to provide means for attaching a snell to a line or hook with facility and ease and in such manner that it is unnecessary to provide the ends of the snell with permanent loops or to tie the same in knots, the attachment being such as to avoid placing strain upon the bend of an end loop and thereby avoid any chance of a break in the snell from this source.

The present invention is applicable to construction of a special fishing hook or as an attachment to a conventional fishing hook, in addition to a novel device which may be applied quickly and easily to a fishing line and to which one end of the snell may be also quickly and easily attached.

Further objects and features of the present invention will become apparent from the following description when considered in connection with the accompanying drawings, and the invention consists in the novel form, combination and arrangement of parts hereinafter more fully described, shown in such drawings, and claimed.

In the drawings:

Figure 1 is an elevational view showing a fishing line equipped with devices constructed in accordance with the present invention.

Figure 2 is an enlarged detail view of one of the devices shown in Figure 1 used to effect connection of a snell to the fishing line.

Figure 3 is an enlarged detail view of the hook and snell attaching device of Figure 1, the view being at right angles to the showing of Figure 1.

Figure 4 is a view looking toward the left of Figure 3 and illustrating the manner of engaging the end of the snell with the attaching device.

Figure 5 is a view similar to Figure 4 of a modified form of hook and snell attaching device.

Figure 6 is a view similar to Figure 5 of a further modification.

Figure 7 is a view similar to Figure 5 of a still further modification.

Figure 8 is a view looking toward the right of Figure 7.

Figure 9 is a view similar to Figure 5 of still another modification; and

Figure 10 is a fragmentary plan view of the device shown in Figure 2, with the snell omitted.

Referring in detail to the drawings, I have shown in Figure 1 an ordinary fishing line 5 equipped with hooks, one of which is indicated at 6. These hooks are connected with the line 5 by means including ordinary gut snells S.

To facilitate attachment of an end of each snell S to its associated fishing hook 6, the shank of the latter is provided at its end with a closed eye 7 arranged in a plane parallel with the plane of the hook shank, and rigid with the hook and projecting from the eye 7 is an attaching arm or elongated attaching member 8 formed of wire and terminating at its free end in an eye member 9. The major portion of the attaching member or arm 8 from the eye 7 to the eye member 9 is given a zig-zag form or bent alternately in opposite directions in the same plane, as will be clear from the several views. In practice, the end of the snell S is passed through the eye 7, and the shorter end portion of the snell is wrapped about the arm or attaching member 8 in the zig-zag bends thereof. The adjacent portion of the longer end of the snell is then wrapped about the arm or member 8 in the opposite direction and in the zig-zag bends thereof so as to overlie the shorter end of the snell at each of such bends and effect a frictional engagement of the contacting portions of the snell and the arm or attaching member 8, the longer end of the snell being passed through the terminal eye member 9. In this way, a quick attachment of the snell with the hook is effected so that it will not become readily detached but may be quickly intentionally detached. In addition, the strain is distributed throughout the length of the attaching arm or member 8 and not at the bend of the loop where the snell passes through the eye 7, thereby minimizing the danger of the snell breaking. In any event, if a break does occur, it will be intermediate the ends of the snell rather than at its point of connection with the hook. In order that the snell may extend in line with the shank of the hook, the eye member 9 is disposed in a plane substantially transverse to the plane of the attaching arm or member 8.

In the embodiment of Figures 1, 3 and 4, the attaching member or arm 8 is formed of a piece of wire separate from the hook, an end portion of this wire member being extended through the eye 7 of the hook and then clinched about the shank of the hook as at 10 directly below the shoulders of the eye 7. In this way, a rigid and permanent attachment of the member or arm 8 to the hook is effected, and it will be seen that a construction of this kind enables conventional hooks to be equipped with snell-attaching devices embodying the present invention. Also, in this form, the eye member 9 is in the form of a closed loop. However, the eye member at the free end of the attaching arm may be in the form of a helix 9a as shown in Figure 5, the convolutions of said helix being spaced apart a sufficient distance to permit passage of the snell therebetween so that the snell may be quickly engaged in the eye by simply wrapping the same about the helix 9a until it is disposed centrally through said helix. This avoids the necessity of threading the end of the longer portion of the snell endwise through the eye member as is necessary with the closed eye member 9 of Figures 1, 3 and 4. Also, as shown in Figure 5, the opposite end of the attaching arm may be twisted about the shank of the hook 6 beneath its eye 7 several times as indicated at 10a, should the same be necessary or desirable for more effective fastening of the attaching arm to the hook. Otherwise, the construction of Figure 5 is similar to Figures 1, 3 and 4, and similar remaining parts are indicated by like reference characters throughout the views.

As shown in Figure 6, the terminal eye member may be of snap-hook formation as indicated at 9b, by simply return-bending the end of the wire member forming the attaching arm 8 so that the terminal of the return-bent end engages an adjacent portion of the wire member as at 11 and is turned outwardly as at 12. Obviously, the snell may be readily passed between the engaging portions as at 11 so as to be quickly positioned within the eye member 9b without threading the end of the snell therethrough. In other respects, the form of Figure 6 is identical with that of Figure 5.

As shown in Figure 7, the attaching arm or member 8 may be an integral part of the hook, the hook and said arm 8 being formed of one piece of wire to provide the eye 7, eye member 9 and attaching arm 8. In this embodiment wherein the attaching arm and hook are formed integral with each other, the terminal eye member 9 may be of any one of several forms shown in connection with the other figures, that illustrated being a closed loop as in Figure 1.

In Figure 9, the attaching arm or member 8 is loosely or pivotally attached to the hook 6 instead of being rigidly attached to the latter as in the other form. For this purpose, the lower end of the attaching arm or member 8 may be simply return-bent to provide a snap-hook member 13 readily engageable in the eye 7 on the end of the hook shank. Otherwise, this construction is similar to that shown in Figures 1, 3 and 4, although the eye member 9 in this embodiment may take any one of the several forms thereof illustrated in the other views.

I have shown in Figures 1 and 2, the incorporation of this invention in a special device for attaching the snells of the hooks to the line 5. This device includes an attaching arm or member 8a similar to the attaching arm 8 of the hook, said attaching arm or member 8a being carried by a part or shank 14 having an eye 15 formed therein at one end of the arm or member 8a, and the latter being provided at its free end with an eye member 9b. The eye member 9b is shown in the form of a helix similar to that indicated at 9a in Figure 5, although the same may be in the nature of a closed loop or a snap-hook as shown with respect to several of the forms of hooks with attaching arms. The shank or part 14 extends laterally from an elongated line attaching member 16 intermediate the ends of the latter, and this line attaching member 16 is formed with end eyes 17 and 17a which may be of snap-hook form or otherwise. The major remaining or intermediate portion of the attaching member 16 is of zig-zag form or bent alternately in opposite directions and in the same plane, so that when the line 5 is wrapped about the member 16 in the zig-zag bends thereof, a frictional engagement is effected between said member and the line sufficient to prevent relative sliding of the member 16 along the line. This friction may be increased by disposing the end eyes 17 and 17a in a plane substantially parallel with the plane of the attaching member 16, the line 5 being extended through said eyes as shown. The description just given applies where the device is used to attach a hook to the line 5 at a point removed from its end, but substantially the same form of device may be utilized for attaching a hook to the extreme end of the line 5 and for also attaching a sinker 18 to such end of the line as shown at the bottom of Figure 1. When used in this way, the end of the line is passed about the part or shank 14 at its juncture with the member 16, the shorter end portion of the line being wound about the member 16 in the bends of the latter and then extended through the terminal eye 17a, the longer portion of the line being wrapped about the member 16 in the opposite direction so as to overlie the wrapped shorter end portion of the line, and also being finally engaged in the eye 17a. This leaves the lower portion of member 16 with its eye 17 clear of the fishing line, and a suitable connector 19 may be utilized for attaching the sinker to the member 16 by engaging said connector in the eye 17. In either case, the snell S of each hook is engaged with the attaching arm or member 8a of the device in exactly the same way as the snell is engaged with the member 8 of hook 6 or as the lower end of the line 5 is engaged with the upper portion of the member 16 at the bottom of Figure 1. In other words, the associated end of snell S is passed through the eye 15 and the shorter end portion is wrapped about the arm 8a and passed through the terminal eye 9b, after which the longer portion of the snell is wrapped about the arm 8a in a reverse direction and passed through the eye 9b, as shown.

This device is preferably formed of two pieces of wire, one of which is bent to provide end portions extending at right angles to each other, one end portion being longer and formed to provide the shank 14, eye 15, attaching arm 8a, and eye member 9b. The other piece of wire is shorter and bent midway between its ends to provide end portions extending at right angles to each other, one of the latter end portions being twisted around and clinched to the shank 14 to rigidly secure the two wire members together with the remaining end portions thereof alined and projecting in opposite directions. Each of said remaining end portions are bent to provide one-half of the line attaching member 16 and one of the eyes 17 or 17a.

From the above description, considered in connection with the accompanying drawings, the simplicity of the device, as well as the advantages thereof, will be perfectly apparent to those skilled in the art. Also, it will be apparent that the invention is susceptible of various minor changes and modifications such as fairly fall within the spirit and scope of the invention as claimed.

What I claim as new is:

1. A fishing tackle member having a shank formed at one end with a closed eye and having an elongated attaching arm connected with and projecting from said eye, said attaching arm comprising a length of wire formed at its free end with an eye member and bent throughout its length from said eye to said eye member in zig-zag form, and a snell having an end passed through said eye to provide a shorter end portion and a longer portion, the shorter end portion being wrapped about the attaching arm in the zig-zag bends thereof and extended through said eye member, the longer portion of the snell being wrapped about said attaching arm in the opposite direction and in the zig-zag bends thereof so as to overlie the shorter end portion of the snell at each of said bends and then being finally extended through said eye member.

2. A fishing tackle member having a shank formed at one end with a closed eye and having an elongated attaching arm connected with and projecting from said eye, said attaching arm comprising a length of wire formed at its free end with an eye member and bent throughout its length from said eye to said eye member in zig-zag form, and a snell having an end extended through said eye to provide a short and a longer end portion, the short end portion being wrapped about the attaching arm in the zig-zag bends thereof and passed through said eye member, and the adjacent part of the longer end portion being wrapped about said arm in the opposite direction and in the zig-zag bends of said arm so as to overlie said shorter end portion of the snell and then passing through said eye member.

3. An attaching device for fishing tackle comprising an elongated piece of wire having a transversely extending part at one end and an eye member at the other end, the major portion of said piece of wire from said transversely extending part to the eye member being bent in zig-zag form, and a snell having an end passed around said transversely extending part to provide a shorter end portion and a longer portion, the shorter end portion being wrapped about said piece of wire in the zig-zag bends thereof and extended through said eye member, the longer portion of the snell being wrapped about said piece of wire in the opposite direction and in the zig-zag bends thereof so as to overlie the shorter end portion of the snell at each of said bends and then being finally extended through said eye member.

4. A fishing hook having a shank formed at one end with a closed eye arranged in a plane parallel with the plane of said shank, a snell attaching arm projecting from and attached to said eye and terminating at its free end in an eye member, said attaching arm comprising a length of wire bent in zig-zag form substantially throughout its length between said eye and said eye member, and a snell having an end passed through said eye to provide a shorter end portion and a longer portion, the shorter end portion being wrapped about the attaching arm in the zig-zag bends thereof and extended through said eye member, the longer portion of the snell being wrapped about said attaching arm in the opposite direction and in the zig-zag bends thereof so as to overlie the shorter end portion of the snell at each of said bends and then being finally extended through said eye member.

5. A fishing hook having a shank formed at one end with a closed eye arranged in a plane parallel with the plane of said shank, a snell attaching arm projecting from and attached to said eye and terminating at its free end in an eye member, said attaching arm comprising a length of wire bent in zig-zag form substantially throughout its length between said eye and said eye member, the other end of said attaching arm being extended through the eye of the hook shank and tightly clinched about said shank directly beneath the shoulders of said eye.

6. A fishing hook having a shank formed at one end with a closed eye arranged in a plane parallel with the plane of said shank, a snell attaching arm projecting from and attached to said eye and terminating at its free end in an eye member, said attaching arm comprising a length of wire bent in zig-zag form substantially throughout its length between said eye and said eye member, the other end of said attaching arm being formed by return bending the same to provide a snap-hook pivotally and detachably engaged in the eye of said hook shank.

7. A device to facilitate attachment of a snell to a fishing line, comprising an elongated line attaching member formed with end eyes and bent throughout its major intermediate portion in zig-zag form, and a shank rigid with and projecting laterally from said line attaching member intermediate the ends of the latter, said shank being formed with a closed eye and having an attaching arm projecting from said eye and terminating at its free end in an eye member, said attaching arm being bent in zig-zag form throughout its length between said eye and said eye member.

EDWARD I. BAKER.